(12) United States Patent
Hu

(10) Patent No.: US 9,356,912 B2
(45) Date of Patent: May 31, 2016

(54) METHOD FOR LOAD-BALANCING IPSEC TRAFFIC

(71) Applicant: ALCATEL-LUCENT USA INC., Murray Hill, NJ (US)

(72) Inventor: Jun Hu, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 99 days.

(21) Appl. No.: 14/463,701

(22) Filed: Aug. 20, 2014

(65) Prior Publication Data
US 2016/0057108 A1 Feb. 25, 2016

(51) Int. Cl.
H04L 29/06 (2006.01)
H04L 12/803 (2013.01)
H04L 12/923 (2013.01)
G06F 21/60 (2013.01)
G06F 9/00 (2006.01)

(52) U.S. Cl.
CPC ............ *H04L 63/029* (2013.01); *G06F 21/606* (2013.01); *H04L 47/125* (2013.01); *H04L 47/762* (2013.01); *H04L 63/0485* (2013.01)

(58) Field of Classification Search
CPC .............. H04L 67/1002; H04L 47/125; H04L 67/1008; H04L 67/101; H04L 67/1029; H04L 67/1023; H04L 67/1027; H04L 67/1038; H04L 67/1031; H04L 67/1017; H04L 45/745; H04L 67/1019; H04L 45/74; H04L 63/08; H04L 67/1036; H04L 63/0272; H04L 63/20; H04L 63/0236; H04L 63/029; H04L 63/0485; H04L 47/762; G06F 21/606
See application file for complete search history.

(56) References Cited

U.S. PATENT DOCUMENTS

| | | |
|---|---|---|
| 6,996,842 B2 | 2/2006 | Strahm et al. |
| 7,120,930 B2 | 10/2006 | Maufer et al. |
| 7,280,540 B2 | 10/2007 | Halme et al. |
| 8,677,114 B2 | 3/2014 | Lewis et al. |
| 2002/0097724 A1* | 7/2002 | Halme ................ H04L 67/1002 370/392 |
| 2002/0133594 A1* | 9/2002 | Syvanne ............. H04L 63/0227 709/226 |
| 2003/0069973 A1* | 4/2003 | Ganesan ................. H04L 29/06 709/226 |
| 2003/0101275 A1* | 5/2003 | Maciel .................... H04L 29/06 709/235 |

(Continued)

Primary Examiner — Darren B Schwartz
(74) Attorney, Agent, or Firm — Tong, Rea, Bentley & Kim, LLC

(57) ABSTRACT

Systems, methods and apparatus for distributing IPsec traffic across multiple IPsec processing units (PUs) by controllably allocating a specific range of one or more IPSec parameters of the IPsec traffic to each PU.

20 Claims, 3 Drawing Sheets

(56) References Cited

U.S. PATENT DOCUMENTS

| | | | |
|---|---|---|---|
| 2003/0195919 A1* | 10/2003 | Watanuki | H04L 29/12462 718/105 |
| 2003/0212907 A1* | 11/2003 | Genty | H04L 29/12009 726/14 |
| 2004/0083295 A1* | 4/2004 | Amara | H04L 12/4645 709/229 |
| 2004/0128553 A1* | 7/2004 | Buer | H04L 63/045 713/154 |
| 2004/0268357 A1 | 12/2004 | Joy et al. | |
| 2005/0055435 A1* | 3/2005 | Gbadegesin | H04L 29/06 709/224 |
| 2006/0106938 A1* | 5/2006 | Dini | G06F 11/008 709/228 |
| 2007/0113087 A1* | 5/2007 | Yoshizawa | H04L 29/125 713/168 |
| 2008/0225714 A1* | 9/2008 | Denis | H04L 41/0896 370/232 |
| 2008/0259797 A1* | 10/2008 | Gruper | H04L 45/00 370/235 |
| 2009/0034417 A1* | 2/2009 | Kondamuru | H04L 67/1008 370/238 |
| 2010/0131638 A1* | 5/2010 | Kondamuru | G06F 9/5083 709/224 |
| 2011/0013639 A1* | 1/2011 | Matthews | H04L 45/00 370/395.32 |
| 2011/0153840 A1* | 6/2011 | Narayana | H04L 67/1029 709/227 |
| 2013/0201989 A1* | 8/2013 | Hu | H04L 45/24 370/392 |
| 2014/0126374 A1* | 5/2014 | Wang | H04L 67/1029 370/235 |

* cited by examiner

METHOD FOR LOAD-BALANCING IPSEC TRAFFIC

FIELD OF THE INVENTION

The invention relates generally to communication networks and, more specifically but not exclusively, to selectively provisioning secure services across a number of secure service processing units.

BACKGROUND

IP Security Protocol (IPsec) traffic and other types of traffic are typically load-balancing among the various network entities processing such traffic to maintain system efficiency, resiliency and so on. That is, it is desirable to distribute IPsec traffic among a plurality of IPsec processing units (IPsec PUs) available to process such traffic.

DNS based load-balancing solutions provide that each IPsec processing unit has a different gateway address, IPsec clients are provisioned with single gateway Fully Qualified Domain Names (FQDNs), and the DNS server returns a list of addresses in a different order for each IPsec client resolve request. In this manner, since IPsec clients will connect to the 1st address in the returned DNS list, the IPsec traffic associated with the various clients is distributed across multiple IPsec processing units. Unfortunately, since the DNS server does not have information pertaining to the availability, capacity and current load of each PU, this load-balancing solution is not accurate and efficient.

Internet Engineering Task Force (IETF) Request for Comments (RFC) 5685 provides an IPsec load-balancing solution wherein the Internet Key Exchange Protocol version 2 (IKEv2) is extended to allow a gateway to redirect an IPsec client to a different gateway during tunnel setup or after tunnel is created. Unfortunately, this solution requires client support of the extended RFC5685, which most IPsec clients lack. Further, the solution pertains to IKEv2 only and does not address the IKEv1 protocol widely in use today.

Other IPsec load-balancing solutions contemplate on-the-fly changing of the destination MAC/IP address associated with IPsec traffic. Unfortunately, this solution is also inefficient since the PU or other entity used to perform such on-the-fly Mac/IP address changes does not have information pertaining to the availability, capacity and current load of each PU. Further, there are additional limitations such as a lack of Authentication Header (AH) mode support due to the changing of destination IP addresses, and requirement of PUs to be in the same network layer due to the changing of destination MAC addresses.

SUMMARY

Various deficiencies of the prior art are addressed by the present invention of systems, methods and apparatus for distributing IPsec traffic across multiple IPsec processing units (PUs) by controllably allocating a specific range of one or more IPSec parameters of the IPsec traffic to each PU.

In various embodiments, a load balancer (LB) disposed between IPsec clients and IPsec processing units forwards IPsec traffic therebetween in accordance with a mapping list provided by a central control module, wherein the mapping list allocates traffic to each PU in accordance with one or more of Internet Key Exchange (IKE), Encapsulating Security Payload (ESP), Authentication Header (AH) Security Parameter Index (SPI) information associated with a particular IPsec packet or stream received by the load balancer.

A method according to one embodiment comprises, allocating a respective range of IPsec traffic parameters to each of a plurality of IPsec processing units to define thereby an allocation of IPsec traffic among the plurality of IPsec processing units; and forwarding toward a load balancer a mapping list indicative of the respective range of IPsec traffic parameters allocated to each of the plurality of IPsec processing units available to receive IPsec traffic via the load balancer. Various embodiments contemplate forwarding each available IPsec processing unit a mapping list indicative of the respective range of IPsec traffic parameters allocated to the respective IPsec processing unit.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DESCRIPTION

The invention will be primarily described within the context of a gateway device communicating with a plurality of IPsec clients and including a load balancer and a plurality of IPsec processing units for processing the IPsec traffic associated with the plurality of IPsec clients. However, those skilled in the art and informed by the teachings herein will realize that the invention is also applicable to various other embodiments as will be described herein.

Figure 1:
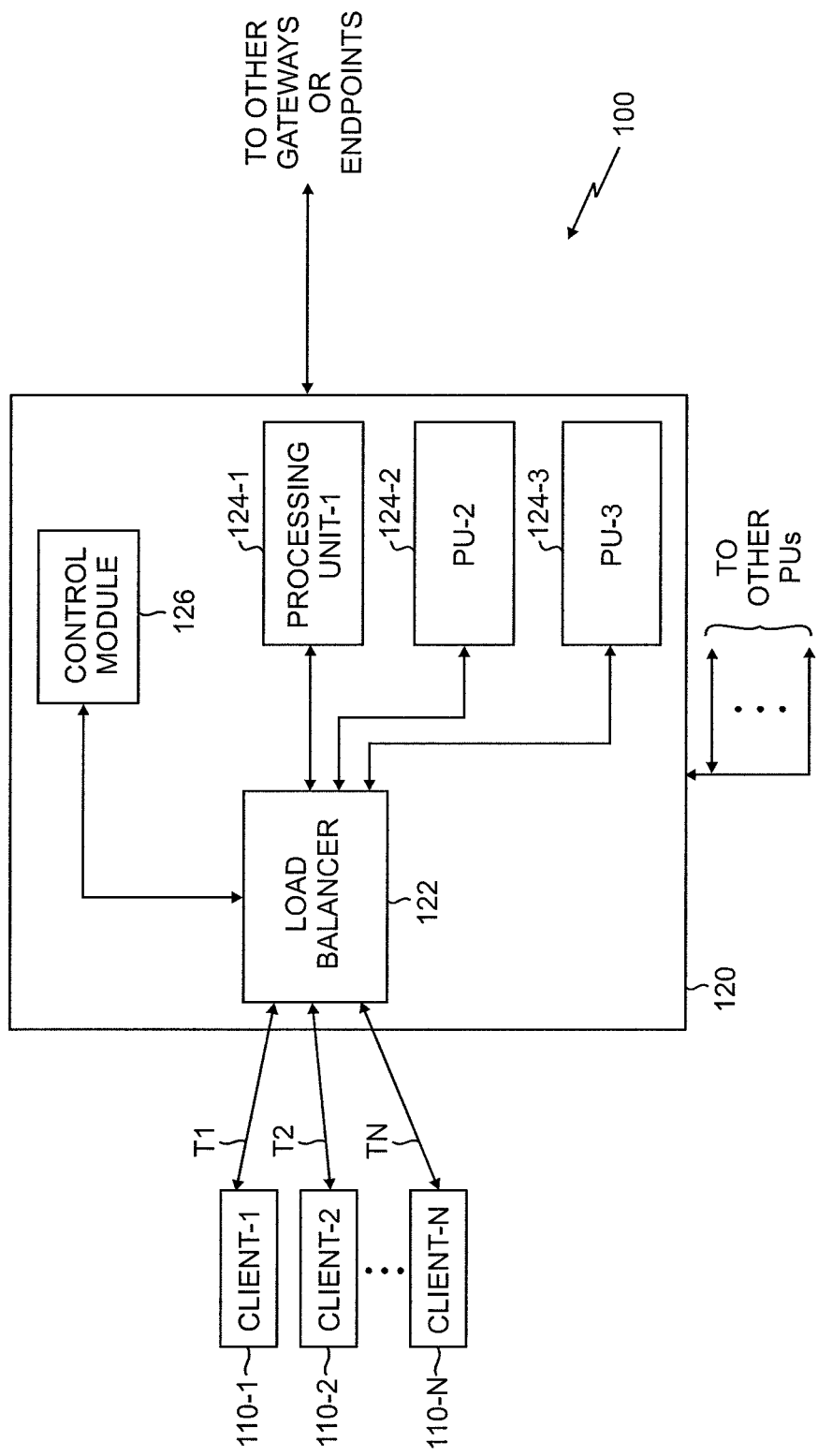
FIG. 1 depicts a block diagram of a system is benefiting from various embodiments.

FIG. 1 depicts a block diagram of a simplified system benefiting from various embodiments. Specifically, FIG. 1 depicts a plurality of IPsec clients 110-1 through 110-N (collectively IPsec clients 110) in secure communication with a gateway device 120, illustratively a Service Gateway (STW), via respective IPsec tunnels T1-TN. The gateway device 120 includes a load balancer 122, a plurality of IPsec processing units (PUs) 124-1 through 124-3 (collectively PUs 124), and a control module 126. Each of the IPsec processing units 124 performs various functions associated with a respective portion of the IPsec tunnels T1-TN, such as communicating secure traffic to and from other gateways or network elements (not shown).

The control module 126 communicates a mapping list to the load balancer to thereby configure allocation of IPsec traffic by the load balancer 122 among the IPsec processing units 124 in accordance with one or more of Internet Key Exchange (IKE), Encapsulating Security Payload (ESP), Authentication Header (AH) Security Parameter Index (SPI) information associated with a particular IPsec packet or stream received by the load balancer 122.

In various embodiments, each IPsec processing unit 124 establishes new IPsec tunnels in accordance with respective mapping list parameters assigned/allocated to the IPsec processing unit by the control module 126. Further, load balancer 122 forwards IPsec packets/traffic toward the various IPsec processing units 124 in accordance with the respective mapping list parameters assigned/allocated to the IPsec processing units by the control module 126. Thus, by knowing the range or values associated with a particular IPsec processing unit, the load balancer may forward IPsec packets/traffic in accordance with the known range or values. Further, when establishing a new IPsec tunnel, a particular IPsec processing unit may utilize parameters within the range of values associated with the particular IPsec processing unit.

In various embodiments, the control module 126 receives management information indicative of availability, utilization level, capacity and so on associated with one or more of the IPsec processing units 124. This management information may be received from other elements within the gateway 120, from a Network Management System (NMS), Elements Management System (EMS) or other network entity aware of such information.

The appropriate IPsec processing unit for a particular IPsec packet is indicated to the load balancer 122 via the mapping list. In various embodiments the selection methodology utilizes operating information associated with the various IPsec processing units to distribute the load of processing the various IPsec tunnels across the available processing units.

In various embodiments, the functions of the load balancer 122 and control module 126 are implemented within the context of a single appliance, device or other functional element within a system to selectively provision or route secure services across a number of secure processing units 124, such as described herein.

In various embodiments, the secure processing units 124 are included within this single appliance, device or other functional element, such as described herein with respect to the gateway 120 depicted in FIG. 1.

In various embodiments, some or all of the secure processing units 124 are not included within this single appliance, device or other functional element, such as where multiple secure processing units 124 are coupled to the single appliance, device or other functional element as necessary to implement a scalable secure services provisioning function.

In various embodiments, a combination of secure processing units 124 included within, and/or external to, this single appliance, device or other functional element is provided, such as where other or external PUs may be operatively connected to the gateway 120, load balancer 122 and/or control module 126 as depicted in FIG. 1.

In various embodiments, a gateway or other device is configured to support IPsec client traffic passing therethrough as described herein. Further, in various embodiments, the gateway or other device includes one or more internal IPsec processing units and is configured to operatively communicate with one or more external IPsec processing units.

In various embodiments, a load balancer is operatively coupled between IPsec client devices and a plurality of IPsec processing units in a network. The mapping list is used by the load balancer to selectively provision or route IPsec traffic between the IPsec client devices and the plurality of IPsec processing units.

In various embodiments, a mechanism implemented by the control module 126 and/or load balancer 122 is provided to identify available IPsec processing units by monitoring data indicative of the health of IPsec processing units, such as internal IPsec processing units or external IPsec processing units. Such health indicative data may comprise status information, query information (e.g., neighboring node "hello" messages and the like), receiving "still alive" messages within predetermined time frames and so on. Thus, in various embodiments, the control module 126 and/or load balancer 122 may responsively adapt mapping list information in response to changes in the number and availability of IPsec processing units (e.g., addition, deletion, failure, restoration), type/capacity of IPsec processing units and so on.

Figure 2:
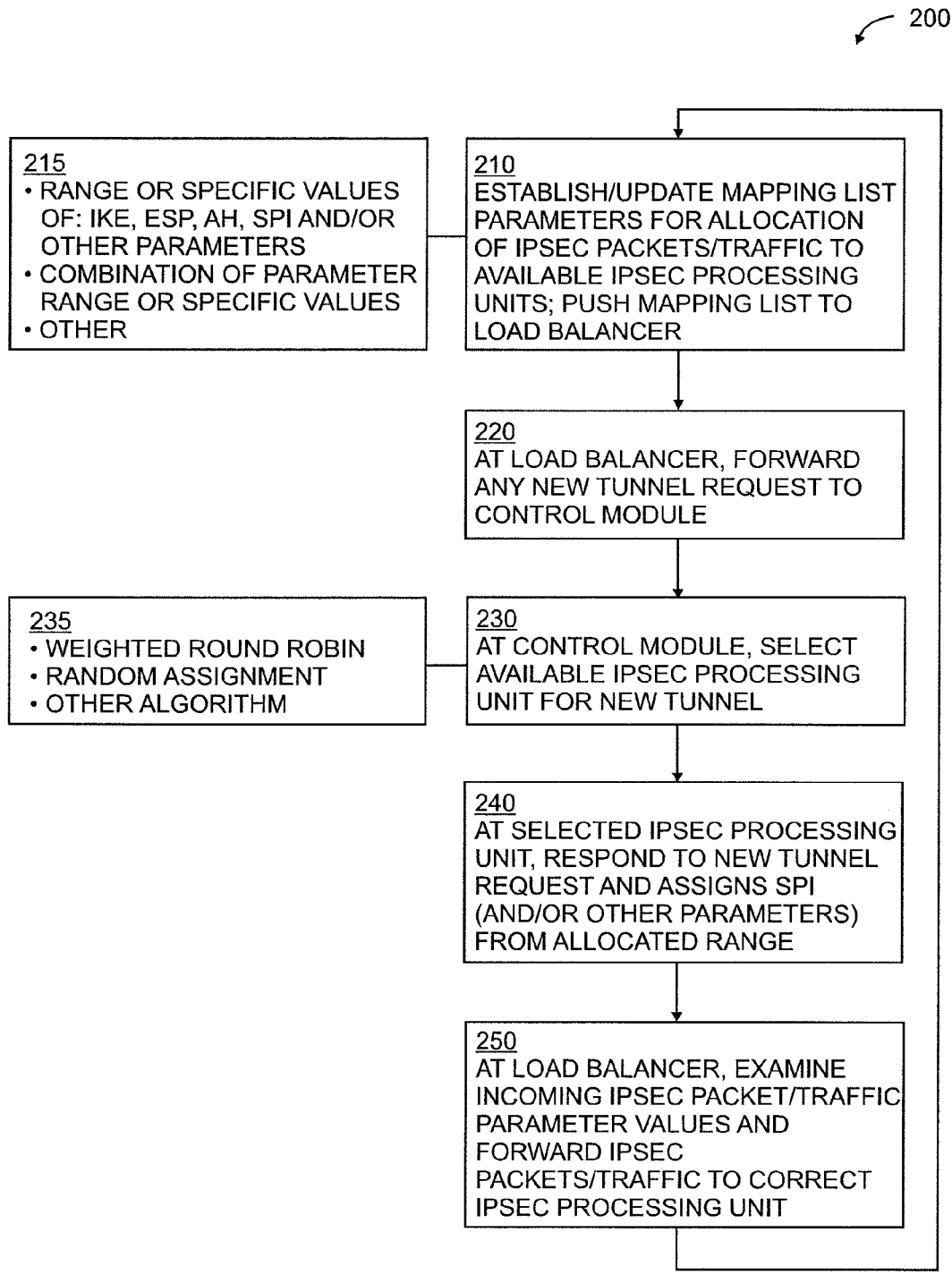
FIG. 2 depicts a flow diagram of a method according to one embodiment.

FIG. 2 depicts a flow diagram of a method according to one embodiment. Specifically, FIG. 2 pics flow diagram of a method 200 suitable for allocating IPsec traffic among a plurality of IPsec processing units such as described above with respect to the system 100 of FIG. 1.

At step 210, mapping list parameters are established or updated to enable allocation of IPsec packets/traffic among available IPsec processing units. The mapping list is pushed or otherwise provided to the load balancer and/or various IPsec processing units. Referring to box 215, mapping list parameters may comprise ranges or specific values of IKE, ESP, AH, SPI and/or other IPsec-related parameters. Further, such ranges of values or individual values may be combined in any manner to enable allocation of IPsec packets/traffic among available IPsec processing units.

By knowing the range or values associated with a particular IPsec processing unit, the load balancer may forward IPsec packets/traffic in accordance with the known range or values. Further, when establishing a new IPsec tunnel, a particular IPsec processing unit may utilize parameters within the range of values associated with the particular IPsec processing unit.

The mapping parameters may be established within the context of an initial allocation of IPsec traffic to available IPsec processing units. The mapping parameters may be updated within the context of additional management information pertaining to loading or other operational characteristics associated with the gateway or other network element. For example, if a particular PU is deemed to be overloaded, or is to be taken out of service for maintenance, then the IPsec load placed upon that PU may be held steady (i.e., not increased) by not assigning new IPsec tunnels, may be decreased to a desired utilization level or even to zero (unloaded). These changes in loading and IPsec allocation are made by the control module updating the mapping list parameter ranges or values associated with a particular PU IPsec processing unit and propagating that information to at least the load balancer.

In various embodiments, the mapping list is updated by policy information received at one or more of load balancer, control module, one or more IPsec processing units and/or other entities. Thus, in various embodiments, messages may be transmitted between the load balancer, control module, one or more IPsec processing units and/or other entities indicative of specific mapping list updates or information relevant to generating mapping list updates, such as the number of available IPsec processing units, the identity of specific available IPsec processing units, the type or types of available IPsec processing units, the present or expected capacity of available IPsec processing units and so on.

At step 220, a new tunnel request is forwarded to the control module. For example, a new tunnel request from an IPsec client 110 received by the load balancer 122 is forwarded to the control module 126.

At step 230, the control module selects an available IPsec processing unit to receive/process IPsec packets/traffic associated with a new tunnel request. Referring to box 235, the IPsec processing unit may be selected using any of a number of allocation methodologies, such as a weighted Round Robin algorithm, a random assignment algorithm or some other methodology. For example, various factors such as a current and/or expected processing load associated with each PU may be evaluated within the context of a PU allocation or selection algorithm. In this manner, a PU that is lightly loaded with respect to other PUs may be preferentially allocated new tunnel requests, while a PU that is heavily loaded with respect to other PUs may not receive new tunnel requests.

At step 240, the selected IPsec processing unit responds to the new tunnel request and assigns, illustratively, a Security Parameter Index (SPI) value from within the SPI range associated with the selected IPsec processing unit. In this manner, traffic/packets associated with the IPsec tunnel created using the assigned SPI value will be forwarded to the selected IPsec processing unit based on the assigned SPI of the received IKE/ESP/AH packet. Other parameters or combinations of parameters may be used to identify the selected IPsec processing unit as described above.

At step 250, the load balancer examines one or more incoming IPsec packets/traffic parameter values (e.g., SPI), determines the appropriate IPsec processing unit associated with the one or more examined parameter values (e.g., falling within a range associated with a particular PU), and forwards the IPsec packets/traffic toward correct IPsec processing unit. In this manner, IPsec packets/traffic are forwarded by the load balancer in accordance with the mapping list parameters provided by the control module.

As an example according to one embodiment, assume that a control module assigns a first range of SPI values X to a first IPsec processing unit PU-1, and a second range of SPI values Y to a second IPsec processing unit PU-2, and then forwards to a load balancer a mapping list of X→PU-1, Y→PU-2.

If a new tunnel (T1) request comes is by the load balancer, then the load balancer forwards the request to the control module.

If the control module selects first IPsec processing unit PU-1 to terminate the tunnel T1, then the control module causes the first IPsec processing unit PU-1 to assign a value (illustratively, SPI A) from its range of SPI values X.

After the IPsec tunnel T1 is established, whenever the load balancer receives an ESP packet with SPI A the load balancer will forward the ESP packet to the first IPsec processing unit PU-1.

Advantageously, it is noted that the various embodiments require no changes to existing IPsec clients. Further, load-balancing decisions may be based upon IPsec processing unit availability, loading, capacity and so on as is indicated by readily available management information. Further, all IPsec processing units use a single gateway address which greatly simplifies the provisioning of IPsec clients. Further, new IPsec processing units may be added incrementally on demand without interrupting existing tunnels or reconfiguring clients. Further, the various embodiments provide support for IKEv1/v2, ESP and AH.

The above-described embodiments generally describe a system in which IPsec traffic is allocated by control module pushing, illustratively, an SPI_range-to-PU mapping list to one or more load balancers and IPsec processing units. The IPsec processing units use information to establish IPsec tunnels having parameters which, when examined by the load balancer, cause a load balancer to forward the associated IPsec packets/traffic to the appropriate IPsec processing unit.

In various embodiments, where load balancer forwarding of IPsec traffic is based on SPI, all PUs may use the same gateway address and additional PUs may be added without interrupting existing tunnels or re-configuring clients. That is, an additional PU may be assigned a new range of SPI values or other mapping list parameter.

In various embodiments, the load balancer is a separate entity or appliance with respect to a gateway device, such as for allocating IPsec traffic to multiple IPsec processing units within a single gateway device, one or more IPsec processing units within a plurality of gateway devices and so on. The load-balancing may be implemented via hardware or via a combination of hardware and software. Load balancer and/or IPsec processing units may be implemented within the context of routers, switching devices and/or other network elements configured to process IPsec traffic. For example, the load balancer may be separate from the gateway device.

Figure 3:
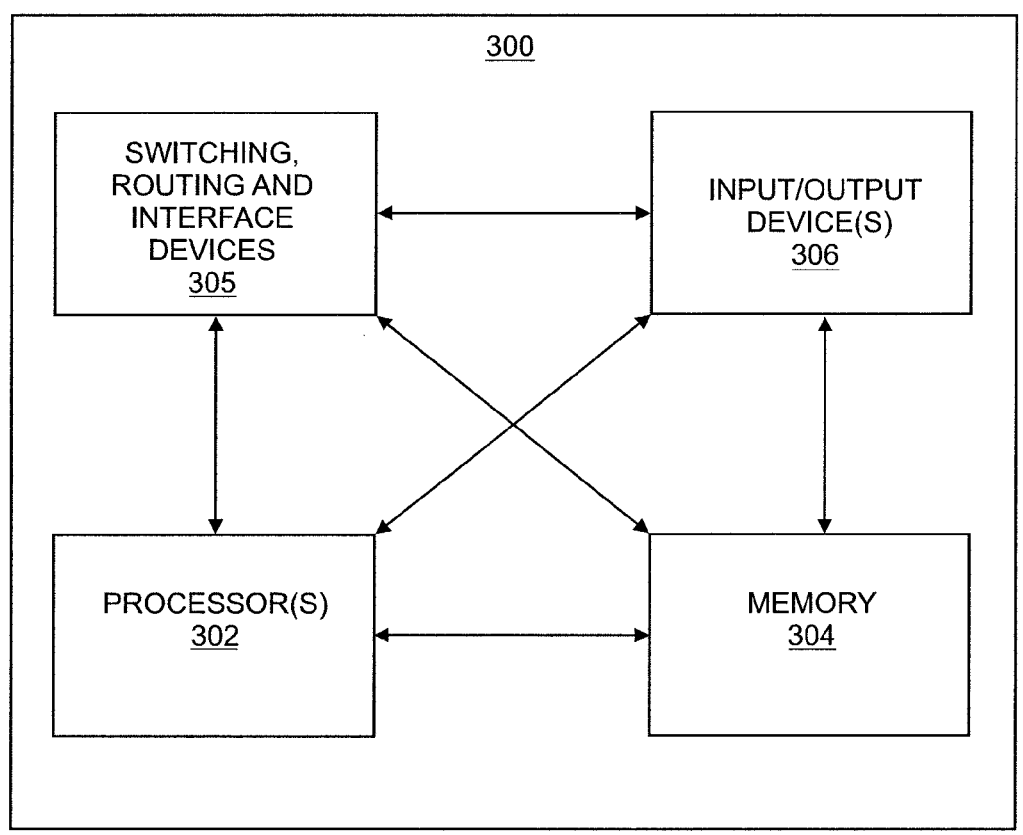
FIG. 3 depicts a block diagram of a computing device suitable for implementing various elements of embodiments described herein.

FIG. 3 depicts a block diagram of a computing device suitable for implementing various elements of embodiments described herein with respect to the figures.

As depicted in FIG. 3, computing device 300 includes a processor element 302 (e.g., a central processing unit (CPU) and/or other suitable processor(s)), a memory 304 (e.g., random access memory (RAM), read only memory (ROM), and the like), cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

In the case of a routing or switching device or component thereof such as gateway 120, load balancer 122, processing unit 124, control module 126, client device and the like, the cooperating module or process 305 may implement various switching devices, routing devices, interface devices and so on as known to those skilled in the art. Thus, the computing device 300 is implemented within the context of such a routing or switching device (or within the context of one or more modules or sub-elements of such a device), further functions appropriate to that routing or switching device are also contemplated and these further functions are in communication with or otherwise associated with the processor 302, input-output devices 306 and memory 304 of the computing device 300 described herein.

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computing device 300 depicted in FIG. 3 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various embodiments contemplate an apparatus including a processor and memory, where the processor is configured for allocating a respective range of IPsec traffic parameters to each of a plurality of IPsec processing units to define thereby an allocation of IPsec traffic among the plurality of IPsec processing units; and forwarding toward a load balancer a mapping list indicative of the respective range of IPsec traffic parameters allocated to each of the plurality of IPsec processing units available to receive IPsec traffic via the load balancer.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
   at a control module, allocating a respective range of at least one IPsec traffic parameter to each of a plurality of IPsec processing units to define thereby an allocation of IPsec traffic among the plurality of IPsec processing units, wherein the IPsec processing units are configured to use the same gateway address;
   at the control module, forwarding toward a load balancer a mapping list indicative of the respective range of the at least one IPsec traffic parameter allocated to each of the plurality of IPsec processing units available to receive IPsec traffic via the load balancer; and
   at the load balancer, examining incoming IPsec packets to identify therein IPsec traffic parameters, using the mapping list to determine a respective IPsec processing unit for each received IPsec packet, and forwarding each IPsec packet toward the determined respective IPsec processing unit.

2. The method of claim 1, further comprising:
   at the control module, forwarding toward each available IPsec processing unit a mapping list indicative of the respective range of the at least one IPsec traffic parameter allocated to the respective IPsec processing unit.

3. The method of claim 2, further comprising:
   at the control module, in response to receiving a new IPsec tunnel request, selecting an IPsec processing unit for supporting a requested new IPsec tunnel and forwarding the new IPsec tunnel request toward the selected IPsec processing unit.

4. The method of claim 3, wherein the new IPsec tunnel request is configured to cause the selected IPsec processing unit to create a new IPsec tunnel using an IPsec traffic parameter within the range of IPsec traffic parameters allocated to the selected IPsec processing unit.

5. The method of claim 1, wherein said allocation of IPsec traffic among the plurality of IPsec processing units is determined according to a random assignment allocation.

6. The method of claim 1, wherein said allocation of IPsec traffic among the plurality of IPsec processing units is determined according to a round robin allocation.

7. The method of claim 1, wherein said allocation of IPsec traffic among the plurality of IPsec processing units is determined according to a weighted round robin allocation.

8. The method of claim 3, wherein said new IPsec tunnel request is received from said load balancer.

9. The method of claim 1, wherein said control module adapts said mapping list in response to changes in a number of available IPsec processing units.

10. The method of claim 1, wherein said control module adapts said mapping list in response to changes in type or capacity of available IPsec processing units.

11. The method of claim 1, wherein said at least one IPsec traffic parameter includes a Security Parameter Index (SPI) associated with a received packet.

12. An apparatus, comprising:
   a load balancer, for identifying at least one IPsec traffic parameter value within received IPsec client traffic and forwarding the received IPsec client traffic toward a plurality of IPsec processing units in accordance with said at least one identified IPsec parameter value, wherein each of the IPsec processing units is associated with a respective range of IPsec traffic parameter values, wherein the IPsec processing units are configured to use the same gateway address.

13. The apparatus of claim 12, further comprising:
   a control module, for allocating a respective range of IP sec traffic parameters to each of the plurality of IPsec processing units to define thereby an allocation of IPsec traffic among the plurality of IPsec processing units, and for generating a mapping list indicative of the range of IPsec traffic parameters allocated to each of the plurality of IPsec processing units available to receive IPsec traffic via the load balancer.

14. The apparatus of claim 12, wherein said control module is configured to select an IPsec processing unit in response to a new IPsec tunnel request.

15. The apparatus of claim 12, further comprising:
   at least a portion of the plurality of IPsec processing units configured to receive IPsec client traffic from the load balancer in accordance with the mapping list.

16. The apparatus of claim 14, wherein said apparatus comprises a gateway configured to support IPsec client traffic passing therethrough.

17. The apparatus of claim 16, wherein said gateway includes a plurality of internal IPsec processing units and is configured to communicate with a plurality of external IPsec processing units.

18. The apparatus of claim 11, wherein said load balancer is operatively coupled between IPsec client devices and said plurality of IPsec processing units in a network.

19. An apparatus including a processor and a memory, wherein the processor is configured for:
   receiving a mapping list indicative of a respective range of at least one IPsec traffic parameter allocated to each of a plurality of IPsec processing units available to receive IPsec traffic, wherein the IPsec processing units are configured to use the same gateway address;
   identifying said at least one IPsec traffic parameter value within received IPsec client traffic;
   determining destination IPsec processing units using said mapping list and said at least one identified IPsec traffic parameter value; and
   forwarding received IPsec client traffic toward IPsec processing units in accordance with said determination.

20. The apparatus of claim 19, wherein the processor is further configured for adapting the mapping list in response to changes in a number of available IPsec processing units, type of available IPsec processing units, or capacity of available IPsec processing units.

* * * * *